US010484635B2

(12) United States Patent
Verdant et al.

(10) Patent No.: US 10,484,635 B2
(45) Date of Patent: Nov. 19, 2019

(54) SYNCHRONOUS TIME CODE IMAGE SENSOR

(71) Applicant: Commissariat à l'Energie Atomique et aux Energies Alternatives, Paris (FR)

(72) Inventors: Arnaud Verdant, Saint-Nazaire-les-Eymes (FR); William Guicquero, Bures-sur-Yvette (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 199 days.

(21) Appl. No.: 15/675,762

(22) Filed: Aug. 13, 2017

(65) Prior Publication Data

US 2018/0124348 A1    May 3, 2018

(30) Foreign Application Priority Data

Nov. 3, 2016   (JP) ...................................... 16 60627

(51) Int. Cl.
  *H04N 5/374* (2011.01)
  *H04N 5/378* (2011.01)
  *H04N 5/355* (2011.01)
  *H04N 5/3745* (2011.01)

(52) U.S. Cl.
  CPC ....... *H04N 5/3742* (2013.01); *H04N 5/35554* (2013.01); *H04N 5/378* (2013.01); *H04N 5/3745* (2013.01)

(58) Field of Classification Search
  CPC ............. H04N 5/3742; H04N 5/35554; H04N 5/3745; H04N 5/378
  See application file for complete search history.

(56) References Cited

U.S. PATENT DOCUMENTS

| 5,461,425 A * | 10/1995 | Fowler ................... H04N 3/155 250/208.1 |
| 6,963,369 B1 * | 11/2005 | Olding ................. H04N 5/3575 348/222.1 |
| 6,977,685 B1 | 12/2005 | Acosta-Serafini et al. |
| 2002/0140834 A1 * | 10/2002 | Olding ................... H04N 5/335 348/294 |

(Continued)

FOREIGN PATENT DOCUMENTS

EP      1052846 A2    11/2000

OTHER PUBLICATIONS

Preliminary Search Report in French Patent Application No. 1660627 dated May 9, 2017, 2 pages.

*Primary Examiner* — Que Tan Le
*Assistant Examiner* — Jennifer D Bennett
(74) *Attorney, Agent, or Firm* — Moreno IP Law LLC

(57) ABSTRACT

An image sensor including: a plurality of pixels, each pixel being capable of supplying an output signal representative of a quantity of light energy received from a time of beginning of a pixel integration phase; and a control circuit configured to, during a phase of acquisition of an image, successively select each pixel a number n of times during a same pixel integration phase, without resetting the pixel between the first and the last selection of the pixel and, for each selection of a pixel, compare the output signal of the pixel with a quantization threshold and read a binary signal representative of the result of the comparison.

20 Claims, 7 Drawing Sheets

(56) References Cited

U.S. PATENT DOCUMENTS

2003/0001080 A1* 1/2003 Kummaraguntla ....... G01J 1/44
　　　　　　　　　　　　　　　　　　　　250/214.1
2004/0174754 A1　 9/2004 Lee et al.
2008/0043128 A1* 2/2008 Poonnen ............... H03M 1/123
　　　　　　　　　　　　　　　　　　　　348/294

* cited by examiner

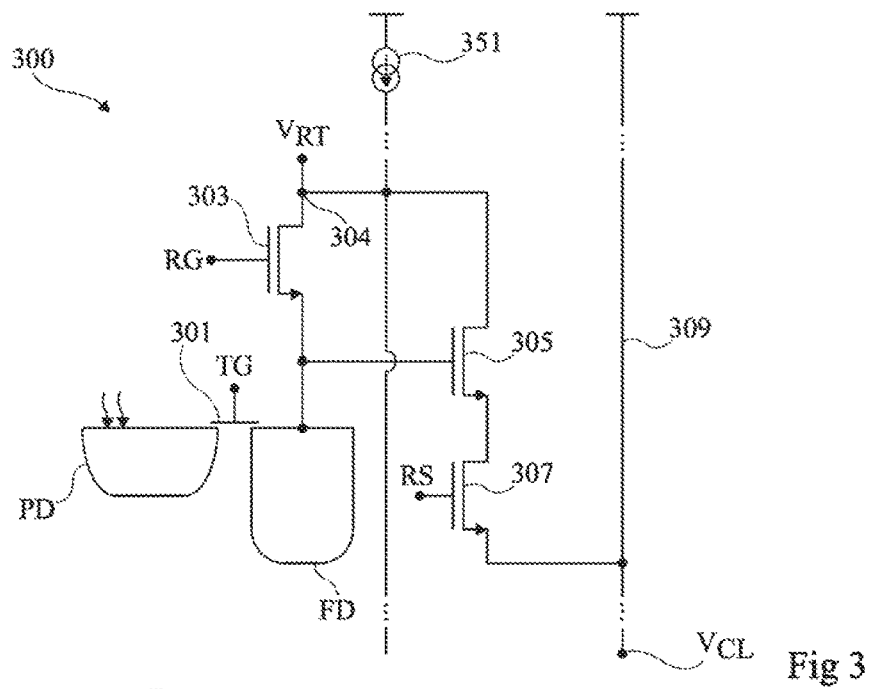
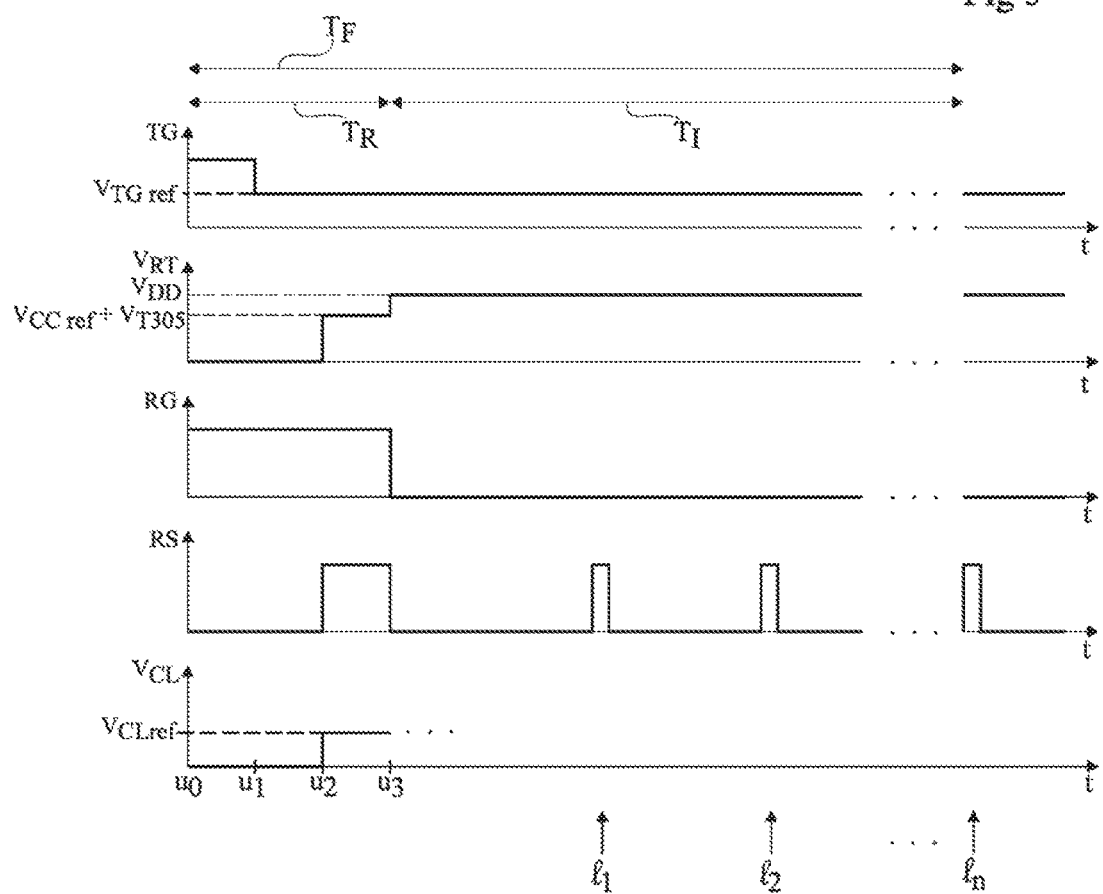

SYNCHRONOUS TIME CODE IMAGE SENSOR

This application claims the priority benefit of French patent application number 16/60627, the content of which is hereby incorporated by reference in its entirety to the maximum extent allowable by law.

BACKGROUND

The present disclosure generally relates to the field of image sensors. It more particularly relates to a synchronous image sensor capable of implementing a time coding of the detected luminosity levels.

DISCUSSION OF THE RELATED ART

Conventionally, an image sensor comprises a plurality of identical or similar elementary cells or pixels, for example arranged in an array of rows and columns. Each pixel comprises a photodetector, for example, a reverse-biased photodiode, having its junction capacitance discharged by a photocurrent according to a received light intensity. Each pixel further comprises a control and readout circuit, capable of supplying an output signal representative of the quantity of light energy received by its photodetector during an integration period.

Conventionally, during an image acquisition phase, each pixel is first reset, after which a phase of pixel integration of predefined duration is implemented. During the integration phase, an analog signal representative of the light intensity received by the photodetector of the pixel is integrated within the pixel. At the end of the integration phase, the integrated signal is digitized by an analog-to-digital conversion circuit external to the pixel, and defines the pixel output value.

A disadvantage of conventional image sensors lies in the complexity and in the relatively high electric power consumption of the analog-to-digital conversion circuits (generally one per sensor pixel column) arranged at the periphery of the pixel array.

The article entitled "Pixel-level A/D conversion: comparison of two charge packets counting techniques", of A. Peizerat et al., describes an image sensor where each pixel comprises an analog-to-digital converter of sigma-delta type. During an image acquisition phase, each pixel is first reset, after which an integration phase of the pixel of predefined duration is implemented. During the integration phase, a current representative of the light intensity received by the photodetector of the pixel is integrated in a capacitor (or analog integrator) of the pixel. The voltage across the integration capacitance of the pixel is continuously compared (asynchronously) with a reference threshold by a comparator internal to the pixel. Each time this voltage reaches the comparator switching threshold, a counter (or digital integrator) internal to the pixel is incremented, and the pixel integration capacitance is reset. At the end of the integration phase, the counter value is read by a circuit external to the pixel and defines the pixel output value.

A disadvantage of this solution is the significant surface area taken up, in each pixel, by the analog-to-digital conversion circuit of the pixel, and in particular by the digital integrator internal to the pixel.

The article entitled "Low-Power, High Dynamic Range CMOS Image Sensor Employing Pixel-level Oversampling ΣΔ Analog-to-Digital Conversion", of Z. Ignjatovic et al., describes an image sensor implementing a sigma-delta type analog-to-digital conversion outside of the pixel array. During an image acquisition phase, each pixel is first reset, after which a phase of pixel integration of predefined duration is implemented. During the integration phase, a current representative of the light intensity received by the photodetector of the pixel is integrated on a capacitive sense node of the pixel. The potential of the sense node is periodically sampled and one-bit quantized by a comparator located outside of the pixel. Each time the comparator switches, that is, each time the potential of the sense node has reached the comparator threshold, the sense node of the pixel is reset. The binary output signal of the comparator is integrated by a digital integrator external to the pixel. At the end of the integration phase, the integrated digital value defines the pixel output value.

A disadvantage of this solution is that, due to the synchronous operation of the comparator, the successive pixel resetting operations during the integration phase should apply to the charges rather than to the voltage, that is, by injection of a predetermined quantity of charges on the pixel sense node. For this purpose, each pixel comprises a reset circuit specific to three transistors, which increases the general bulk of the pixel.

An object of an embodiment is to provide an image sensor which overcomes all or part of the above-mentioned disadvantages.

SUMMARY

Thus, an embodiment provides an image sensor comprising:
- a plurality of pixels, each pixel being capable of supplying an output signal representative of a quantity of light energy received from a time of beginning of an integration phase of the pixel; and
- a control circuit configured to, during a phase of acquisition of an image, successively select each pixel a number n of times during a same integration phase of the pixel, without resetting the pixel between the first and the last selection of the pixel and, for each selection of a pixel, compare the output signal of the pixel with a quantization threshold and read a binary signal representative of the result of the comparison.

According to an embodiment, the control circuit is configured so that the time interval between two successive selections of the pixel is substantially constant all along the pixel integration phase.

According to an embodiment, the control circuit is configured so that the time interval between two successive selections of the pixel varies during the pixel integration phase.

According to an embodiment, the control circuit is configured so that the time interval between two successive selections of the pixel is inversely proportional to the rank of the first of the two selections among the n successive selections of the pixel of the integration phase.

According to an embodiment, each pixel comprises:
- a photodiode;
- a capacitive readout region;
- a reset transistor coupling the capacitive readout region to a reset node of the pixel;
- a readout transistor assembled as a follower source, having its gate connected to the capacitive readout region and having its drain connected to the reset node; and
- a selection transistor coupling the source of the readout transistor to an output conductive track of the pixel.

According to an embodiment, the control circuit is configured to, during an image acquisition phase, implement, for each pixel, a pixel setting phase comprising resetting the capacitive readout region of the pixel to a first reference voltage via the output conductive track, the selection transistor, the readout transistor, and the pixel reset transistor.

According to an embodiment, the control circuit is configured to, during a pixel initialization phase, configure the pixel as a common-source amplifier by applying a bias current to the pixel reset node and by applying a fixed reference potential to the output conductive track of the pixel.

According to an embodiment, the control circuit is configured to, during a pixel initialization phase, implement the successive steps of:

setting to a reference potential the output conductive track of the pixel and then setting to a high impedance state said output conductive track;

controlling the reset transistor and the selection transistor to the on state; and setting to a high impedance state the pixel reset node and forcing the output conductive track of the pixel to the reference potential.

According to an embodiment, each pixel further comprises a transfer gate capable of controlling the transfer of the photogenerated charges between its photodiode and its readout region.

According to an embodiment, the control circuit comprises a peripheral readout circuit comprising at least one comparator, and each pixel has its output conductive track connected to a first input of said at least one comparator.

According to an embodiment, the control circuit is configured to, for each selection of a pixel during a pixel integration phase, implement the steps of:

a) precharging the output conductive track of the pixel to a second reference voltage;

b) applying a third reference voltage greater than the second reference voltage to a second input of said at least one comparator;

c) turning on the pixel selection transistor; and d) after a predetermined settling time after step c), reading the output value of the comparator.

According to an embodiment, the pixels are arranged in an array of rows and columns, and the control circuit is capable of simultaneously controlling the pixels of a same row and of successively controlling the pixels of different rows according to a control method of rolling shutter type.

According to an embodiment, the quantization threshold is adjustable.

Another embodiment provides a device comprising a sensor such as defined hereabove, and a circuit for processing on the fly the binary signals read by the sensor control circuit.

According to an embodiment, the processing circuit is capable, for each scanning of all the sensor pixels, of multiplying a binary input vector formed by all the binary signals read by the control circuit of the sensor for the different sensor pixels, by a transformation matrix.

According to an embodiment, the processing circuit is capable, during successive scannings of all the sensor pixels, of integrating successive output vectors resulting from the multiplication of the successive input vectors by the transformation matrix.

The foregoing and other features and advantages will be discussed in detail in the following non-limiting description of dedicated embodiments in connection with the accompanying drawings.

BRIEF DESCRIPTION OF THE DRAWINGS

FIG. 3 is an electric diagram of an example of a pixel of an image sensor according to the first embodiment;

FIG. 4 is a timing diagram schematically illustrating an example of a method of controlling the pixel of FIG. 3 according to the first embodiment;

DETAILED DESCRIPTION OF THE PRESENT EMBODIMENTS

Figure 1:
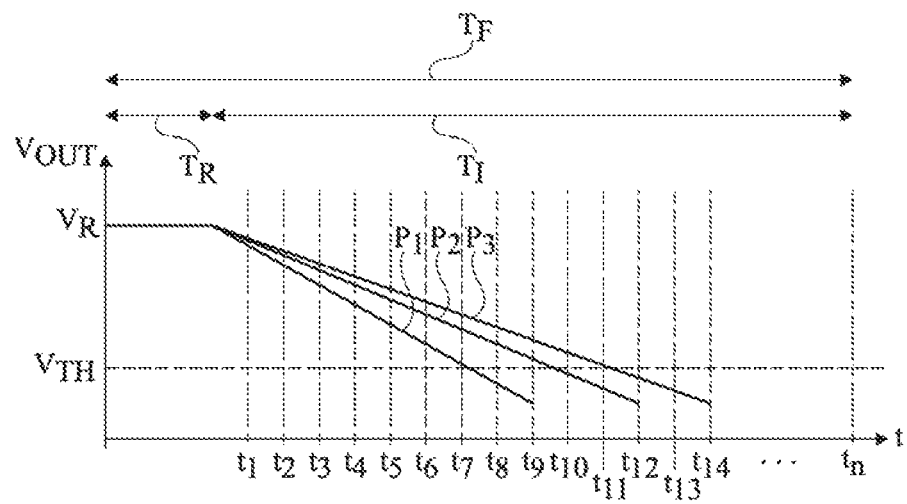
FIGS. 1, 2A, 2B, and 2C are timing diagrams schematically illustrating the operation of an image sensor according to a first embodiment.

The same elements have been designated with the same reference numerals in the different drawings and, further, the various drawings are not to scale. For clarity, only those elements which are useful to the understanding of the described embodiments have been shown and are detailed. In particular, the peripheral circuits for controlling the described image sensors have not been detailed, the forming of such circuits being within the abilities of those skilled in the art based on the described functional indications. Unless otherwise specified, expressions "approximately", "substantially", and "in the order of" mean to within 10%, preferably to within 5%. Further, term "connected" is used to designate a direct electric connection, with no intermediate electronic component, for example, by means of one or a plurality of conductive tracks or conductive wires, and term "coupled" or term "linked" is used to designate an electric connection which may be direct (then meaning "connected") or indirect (that is, via one or a plurality of intermediate components).

According to an aspect of an embodiment, a sensor comprising a plurality of identical or similar pixels, each pixel comprising a photodetector, for example, a photodiode, and a control and readout circuit capable of integrating, on a capacitive pixel sense node, a photocurrent representative of the light flow received by the pixel photodetector, is provided. The sensor operates as follows. During an image acquisition phase, each pixel is first reset, after which an integration phase of predefined duration is implemented. During the integration phase, the voltage on the pixel sense node decreases according to the quantity of light energy received by the pixel since the beginning of the integration phase. This voltage is successively synchronously sampled and one-bit quantized a plurality of times, for example, periodically, by a peripheral readout circuit external to the pixel. The resulting binary signal may be stored and/or integrated in a digital integrator external to the pixel, for example, a digital counter. According to an aspect of an embodiment, the pixel is not reset during the integration period, which is a difference with respect to the operating mode described in Z. Ignjatovic et al.'s above-mentioned article, where the pixel is reset each time its output voltage exceeds the quantization threshold.

FIGS. 1, 2A, 2B, and 2C are timing diagrams schematically illustrating the operation of an image sensor according to an embodiment.

FIG. 1 shows the time variation, for three different pixels $P_1$, $P_2$, $P_3$ of the sensor, of output voltage $V_{OUT}$ of the pixel (that is, the voltage on the capacitive sense node of the pixel) during an image acquisition phase $T_F$.

During acquisition phase $T_F$, each pixel is first reset during an initialization phase $T_R$. During initialization phase $T_R$, the pixel output voltage is set to a value $V_R$. An integration phase of pixel $T_I$ of predefined duration is then implemented. During integration phase $T_I$, the output voltage $V_{OUT}$ decreases at a speed which is a function of the light intensity received by the pixel. During integration phase $T_I$, the pixel is read out a plurality of times at predetermined times $t_1, \ldots t_n$, where n is an integer designating the number of successive readings of the pixel during integration phase $T_I$, for example greater than or equal to 4. In the shown example, the pixel is periodically read out at a frequency in the order of $n/T_I$ all along integration phase $T_I$.

Each time the pixel is read out, output voltage $V_{OUT}$ of the pixel is 1-bit quantized. To achieve this, output voltage $V_{OUT}$ of the pixel is compared with a predefined threshold $V_{TH}$ by a comparator external to the pixel, and the result of the comparison is stored. At the end of integration phase $T_I$, the obtained sequence of n binary samples defines the pixel output value.

Figure 2A:
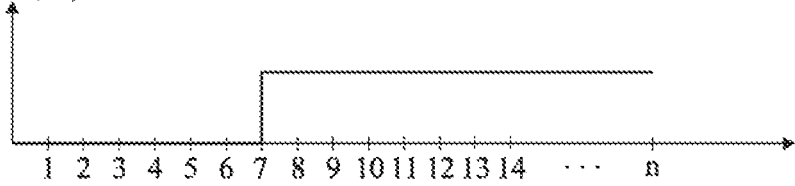
Figure 2B:
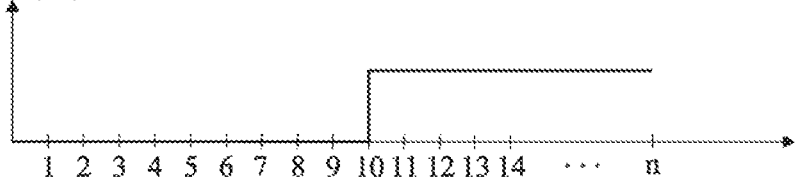
Figure 2C:
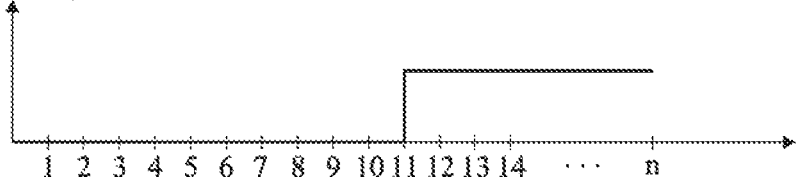

FIGS. 2A, 2B, and 2C respectively show, for pixels $P_1$, $P_2$, and $P_3$, the sequence of the n output bits $B_{OUT}$ of the quantizer acquired during integration phase $T_I$.

As shown in the drawings, as long as output voltage $V_{OUT}$ of the pixel is greater than threshold $V_{TH}$, the binary output signal of the pixel is in a first state (the low state in the shown example). When output voltage $V_{OUT}$ of the pixel crosses threshold $V_{TH}$, the binary output signal of the pixel switches to a second state (the high state in the shown example). Since the pixels are not reset during integration phase $T_I$, the binary output signal of the pixel then remains in the second state until the end of integration phase $T_I$.

The position of the transition edge between the low state and the high state in the binary pixel output sequence is representative of the light intensity received by the pixel during integration phase $T_I$. The more strongly the pixel is illuminated, the sooner the transition edge occurs in the binary pixel output sequence, and conversely.

As an example, the n values of the binary output sequence of the pixel may be digitally integrated to provide an output value of the pixel coded over a number of bits smaller than n. As an example, the n output bits of the quantizer may be added to generate an output value of the pixel over $\log_2(n)$ bits. There thus is an equivalence between a binary representation of the image according to the disclosed code and an integer representation of this same image. Thus, any processing capable of being carried out on an integer representation of an image may be transposed onto a binary representation of the image. The digital integration of the output bits of the quantizer is for example performed on the fly by a digital counter external to the pixel incrementing a digital output value of the pixel each time the quantizer generates a bit in the high state for the pixel.

The operating mode described in relation with FIGS. 1, 2A, 2B, and 2C enables to perform a time coding of the output values of the pixel. Indeed, the output value of a pixel is representative of the time taken by the pixel to reach quantization threshold $V_{TH}$. A digital coding of the output values of the pixels inversely proportional to the intensity of the light flow received by the pixels can then be performed, if the time interval separating two successive pixel readout operations remains constant for the entire duration of the integration phase. Indeed, considering a pixel comprising a photodiode of capacitance C and having its output voltage $V_{OUT}$ corresponding to the voltage across the photodiode, voltage $V_{OUT}$ varies over time t proportionally to a photocurrent $i_{ph}$ flowing through the photodiode according to the following relation:

$$V_{OUT}=V_R-(i_{ph}/C)*t$$

The time $t2V_{TH}$ taken by the pixel to reach threshold $V_{TH}$ can then be expressed by the following relation:

$$t2V_{TH}=(V_R-V_{TH})*C/i_{ph}$$

An advantage of the operating mode described in relation with FIGS. 1, 2A, 2B, and 2C is that it is compatible with conventional pixel structures. In particular, conversely to the solution described in Z. Ignjatovic et al.'s article, it is not necessary to add reset circuits specific to the pixels since the pixels are not reset during integration period $T_1$.

FIG. 3 is an electric diagram of an example of a pixel 300 of an image sensor according to an embodiment.

Pixel 300 of FIG. 3 is a 4T-type pixel, that is, a pixel comprising a photodiode and four control transistors. Pixel 300 comprises a photodiode PD, for example, a pinned photodiode, particularly comprising a semiconductor photogenerated charge storage region. Pixel 300 further comprises a readout region FD formed in the same semiconductor substrate as photodiode PD. Pixel 300 further comprises a transfer gate 301 (or transfer transistor) connected to a node of application of a control voltage TG, enabling to control the transfer of the photogenerated charges from the storage region of photodiode PD to readout region FD. Pixel 300 further comprises a reset transistor 303 coupling readout region FD to a node 304 of application of a reset potential $V_{RT}$. In the shown example, transistor 303 is an N-channel MOS transistor having its source connected to readout region FD and having its drain connected to node 304. The gate of transistor 303 is connected to a node of application of a control voltage RG. Pixel 300 further comprises a readout transistor 305 assembled as a voltage follower, having its gate connected or coupled to readout region FD. In the shown example, transistor 305 is an N-channel MOS transistor and has its drain connected to node 304. Pixel 300 further comprises a selection transistor 307 coupling the source of readout transistor 305 to an output conductive track 309. In the shown example, transistor 307 is an N-channel MOS transistor having its drain connected to the source of transistor 305 and having its source connected to output track 309. The gate of transistor 307 is connected to a node of application of a control voltage RS.

As an example, a sensor according to an embodiment comprises a plurality of pixels identical or similar to pixel 300 of FIG. 3, arranged in an array of rows and columns. The sensor pixels are for example controllable simultaneously row by row. To achieve this, the pixels of a same row have their respective nodes TG connected to a same control conductive track and the pixels of different rows have their respective nodes TG connected to different control conductive tracks. To achieve this, the pixels of a same row have their respective nodes RG connected to a same control conductive track and the pixels of different rows have their respective nodes RG connected to different control conductive tracks. To achieve this, the pixels of a same row have their respective nodes RS connected to a same control conductive track and the pixels of different rows have their respective nodes RS connected to different control conductive tracks. To achieve this, the pixels of a same column have their respective nodes 304 connected to a same bias conductive track and the pixels of different columns have their respective nodes 304 connected to different bias conductive tracks. Further, as an example, the pixels of a same column are connected to a same output conductive track 309 and the pixels of different columns are connected to different output conductive tracks 309.

FIG. 4 is a timing diagram schematically illustrating an example of a method of controlling a sensor of the type described in relation with FIG. 3. FIG. 4 more particularly illustrates the variation of control signals TG, RG, and RS, as well as of potential $V_{RT}$, applied to the pixels 300 of a same sensor row during an image acquisition phase $T_F$. FIG. 4 further illustrates the variation of a potential $V_{CL}$ applied to output conductive tracks 309 of the row pixels during acquisition phase $T_F$. The control sequence described in relation with FIG. 4 may be substantially identically repeated for each sensor pixel row with a time shift between two successive rows substantially equal to duration $T_L$ of implementation of a pixel readout ("rolling shutter"-type control).

At a time $u_0$ of beginning of acquisition phase $T_F$, reset transistors 303 and transfer transistors 301 are controlled to the on state. To achieve this, signals TG and RG are set to a high level. Potential $V_{RT}$ is set to a low level, for example, to ground. This results in filling with electrons photodiode PD and readout region FD of each pixel in the row, as well as the transfer area between photodiode PD and readout region FD of the pixel. During this step, selection transistor 307 of the pixel is maintained off. To achieve this, signal RS is kept at a low level.

At a time $u_1$ subsequent to time up, signal TG is set to a level $V_{TGref}$ intermediate between a low level, for which transfer transistor 301 is off, and the high level, for which transfer transistor 301 is fully conductive. Level $V_{TGref}$ is lower than the photodiode pinch-off voltage, that is, the transfer of the electrons between photodiode PD and readout region FD is not blocked, but electrons have to cross a potential barrier to pass from photodiode PD to readout region FD. In other words, photogenerated electrons can only pass from photodiode PD to the readout region when the potential of the storage region of photodiode PD falls below a threshold set by value $V_{TGref}$.

At a time $u_2$ subsequent to time $u_1$, each pixel in the row is configured as a common-source amplifier. To achieve this, a bias current is applied to the conductive track interconnecting nodes 304 of the column pixels, by a controllable current source 351 (FIG. 3) arranged outside of the pixel, for example, at the head of the column. During this step, potential $V_{CL}$ of output conductive track 309 of the pixel is held at a positive value $V_{CLref}$ by a peripheral control circuit (not shown) external to the pixel. Further, selection transistor 307 is controlled to the on state. To achieve this, signal RS is set to a high level. Reset transistor 303 is kept on (RG in the high state). A feedback amplifier assembly is thus obtained. The potential on node 304, which sets the initialization potential of readout region FD, settles at a value substantially equal to $V_{CLref}+V_{T305}$, where $V_{T305}$ designates the threshold voltage of follower transistor 305. The potential in the storage region of photodiode PD settles at the limit of the potential barrier set by value $V_{TGref}$, it being understood that value $V_{CLref}$ is selected to be such that $V_{CLref}+V_{T305}$ is greater than the potential barrier set by value $V_{TGref}$.

At a time $u_3$ subsequent to time $u_2$, transistor 303 is turned off. To achieve this, signal RG is set to a low level. Further, the potential $V_{RT}$ applied to node 304 is set to a high reference level, for example, a high sensor power supply potential $V_{DD}$. Signal TG is held at intermediate value $V_{TGref}$, thus introducing no disturbance by capacitive coupling between node FD and gate 301. At time $u_3$, transistor 307 is further turned off. To achieve this, signal RS is set to a low level.

Time $u_3$ marks the end of a phase $T_R$ of initialization of the pixels in the row, ranging from time $u_0$ to time $u_3$, and the beginning of a phase $T_I$ of integration of the pixels in the row. From time $u_3$, in each pixel in the row, all the charges photogenerated in photodiode FD are automatically transferred into readout region FD, due to the setting of photodiode PD to a potential substantially equal to the limit of the potential barrier set by potential $V_{TGref}$. The charge-to-voltage conversion gain of the pixel is thus preserved during the readout which will be performed during phase $T_I$. The potential of readout region FD thus decreases at a speed which is a function of the light flow received by photodiode PD of the pixel.

After time $u_3$, a first readout $1_1$ of the pixel is performed. To achieve this, selection transistor 307 is turned on (signal RS at a high level), so that the potential of readout region FD of the pixel is transferred onto output conductive track 309 of the pixel. Node FD having been initialized at a potential depending on the threshold voltage $VT_{305}$ of readout transistor 305 of the pixel, the potential transferred onto track 309 is independent from threshold voltage $VT_{305}$ (the initial potential of node FD at time u3 of beginning of phase $T_I$ when signal RS is still in the high state is independent from threshold voltage $VT_{305}$). The potential transferred onto track 309 is compared with a threshold by a comparator (not shown in FIG. 3) external to the pixel, to generate a first bit of a binary sequence representative of the pixel illumination level. In this example, the sensor comprises one 1-bit quantizer per pixel column, to be able to simultaneously read out all the pixels in the row.

Once readout $1_1$ has been performed, selection transistor 307 is turned off (signal RS in the low state). The other pixel rows of the sensor are then successively read out in the same way. When all the sensor rows have been read out, a second readout $1_2$ of the pixels in the row is performed, and so on until a ninth readout $1_n$, which marks the end of phase $T_1$ of integration of the pixels in the row.

Figures 5A, 5B, 5C:
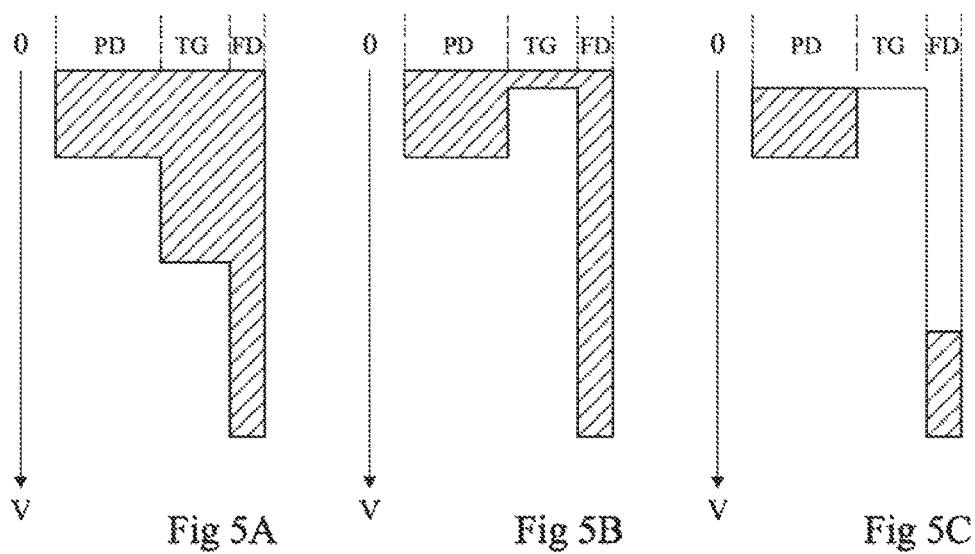
FIGS. 5A, 5B, and 5C schematically illustrate the behavior of the pixel of FIG. 3 during an initialization phase of the control method of FIG. 4.

FIGS. 5A, 5B, and 5C schematically show the potential wells in photodiode PD, in the transfer region controlled by transfer gate 301 (TG), and in readout region FD during the above-mentioned steps of phase $T_R$ of initialization of the pixels in the row. FIGS. 5A, 5B, and 5C further illustrate in hatchings the level of filling of the potential wells with electrons. As appears in the drawings, the maximum of the potential well defined in photodiode PD (pinch-off voltage) is smaller than the maximum of the potential well defined in readout region FD, which enables to transfer all the photogenerated electrons from photodiode PD to readout region FD when the potential barrier between photodiode PD and readout region FD is sufficiently lowered (the potential barrier imposed by potential TG of gate 301 settles at $V_{TG}-V_{T301}$, $V_{T301}$ designating the threshold voltage of the transistor defined by gate 301. The charge transfer between photodiode PD and readout region FD is thus total when value $V_{TG}-V_{T301}$ is greater than the pinch-off voltage of photodiode PD). The height of the potential barrier formed by the transfer region controlled by transfer gate 301 varies according to the control signal applied to gate 301.

FIG. 5A corresponds to the first step of phase $T_R$ of initialization of the pixel, between times $u_0$ and $u_1$. During this step, the level of the potential barrier set by the control signal of high level applied to transfer gate 301 is greater than the maximum of the potential well defined in photodiodes PD (or pinch-off voltage of photodiode PD), and smaller than the maximum of the potential well defined in readout region FD. The potential wells defined in regions PD and FD and in the transfer region (TG) are totally filled with electrons.

FIG. 5B corresponds to the second step of the phase of initialization of the pixel, between times $u_1$ and $u_2$. During this step, the level of the potential barrier depending on the control signal of intermediate level $V_{TGref}$ applied to transfer gate 301 is lower than the maximum of the potential well defined in photodiodes PD, and lower than the maximum of the potential well defined in readout region FD. The potential wells defined in regions PD and FD and in the transfer region (TG) are still totally filled with electrons.

FIG. 5C corresponds to the third step of the phase of initialization of the pixel, between times $u_2$ and $u_3$. During this step, the level of the potential barrier set by the control signal of intermediate level $V_{TGref}$ remains unchanged with respect to the previous step, which enables to avoid the introduction of disturbances by capacitive coupling with gate 301. However, part of the electrons previously present in the structure are discharged. More particularly, the potential of photodiode PD settles at the limit of potential barrier $V_{TGref}-V_{T301}$ set by the signal applied to gate 301, and the potential of readout region FD settles at an initialization value substantially equal to $V_{CLref}+V_{T305}$.

An advantage of such an initialization method is that the initialization potential of readout region FD takes into account threshold voltage $V_{T305}$ of the pixel readout transistor. This enables to avoid possible artifacts which might occur in the image due to threshold voltage dispersions of readout transistors 305 between different pixels of the sensor.

Figure 6:
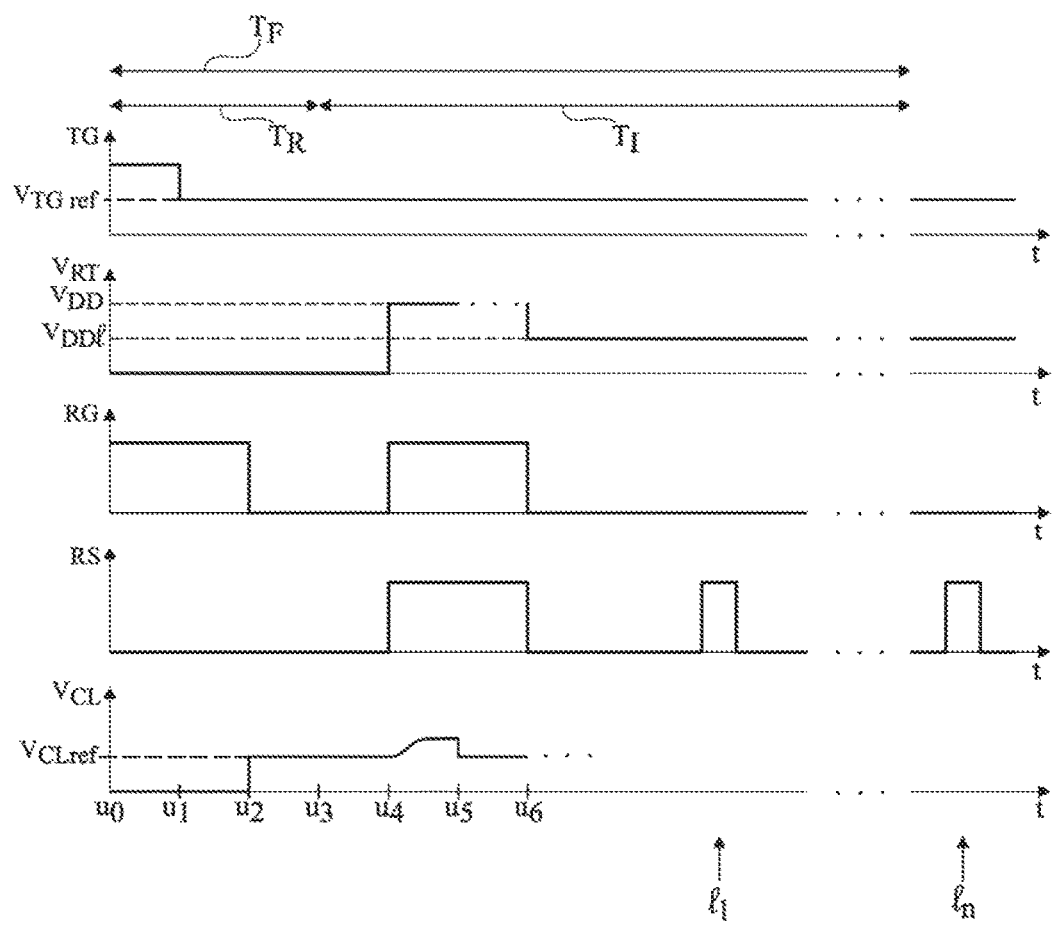
FIG. 6 is a timing diagram schematically illustrating another example of a method of controlling the pixel of FIG. 3 according to the first embodiment.

FIG. 6 is a timing diagram schematically illustrating a variation of the control method of FIG. 4. FIG. 6 more particularly illustrates an alternative embodiment of phase $T_R$ of initialization of the sensor pixels. FIG. 6 shows, as in FIG. 4, the variation of signals TG, RG, RS, $V_{RT}$ and $V_{CL}$ during an image acquisition phase $T_F$.

At a time $u_0$ of beginning of acquisition phase $T_F$ (corresponding to the time of beginning of initialization phase $T_R$), reset transistor 303 and transfer transistors 301 of the pixels in the row are controlled to the on state (signals TG and RG at a high level). Potential $V_{RT}$ is set to a low level, for example, to ground. This results in filling with electrons photodiode PD and readout region FD of each pixel in the row, as well as the transfer area between photodiode PD and readout region FD of the pixel. During this step, pixel selection transistor 307 is kept off (signal RS at a low level).

At a time $u_1$ subsequent to time up, signal TG is, as in the example of FIG. 4, set to a level $V_{TGref}$ intermediate between the low level, for which transfer transistor 301 is off, and the high level, for which transfer transistor 301 is fully conductive.

At a time $u_2$ subsequent to time $u_1$, transistor 303 is controlled to the off state (signal RG in the low state), and transistor 307 is kept off (signal RS in the low state). Conductive column track 309 is set to a reference potential $V_{CLref}$, for example, in the order of 1 V.

At a time $u_3$ subsequent to time $u_2$, conductive track 309 is set to high impedance (that is, left floating).

At a time $u_4$ subsequent to time $u_3$, transistors 307 and 303 are controlled to the on state (signals RS and RG in the high state). Potential $V_{RT}$ applied to node 304 is set to a high state, for example, to high power supply potential $V_{DD}$ of the sensor, for example, in the order of 2.5 V. The potential of readout region FD then tends towards value $V_{DD}-V_{T303}$, $V_{T303}$ designating the threshold voltage of transistor 303. The stray capacitances of transistors 305 and 307 balance each other by drawing the necessary charges from the stray capacitance of track 309 kept in high impedance. Such a precharge of the stray capacitances enables to avoid for charges to be drawn from region FD at the next step, particularly to charge the stray gate-source capacitance of transistor 305. The gate-source voltage of transistor 305 then settles at a level enabling a drain-source current to flow through the transistor (this condition is fulfilled if condition $V_{DD}-V_{CLref}>VT_{305}$ is respected).

At a time $u_5$ subsequent to time $u_4$, node 304 is set to high impedance, after which conductive track 309 is forced again to reference potential $V_{CLref}$. The potential of region FD then tends towards potential $V_{CLref}+V_{T305}$, below which transistor 305 will conduct a negligible current and may be considered off.

At a time $u_6$ subsequent to time $u_5$, transistor 303 is turned back off (signal RG in the low state). At a time $u_6$, transistor 307 is further turned off (signal RS in the low state).

Time $u_6$ marks the end of initialization phase $T_R$ of the pixels in the row, and the beginning of an integration phase $T_I$ of the pixels in the row. From time $u_6$, in each pixel in the row, all the charges photogenerated in photodiode FD are automatically transferred into readout region FD, due to the setting of photodiode PD to a potential substantially equal to the limit of the potential barrier set by potential $V_{TGref}$.

The control of the pixels during integration phase $T_I$ is then identical or similar to what has been described in relation with FIG. 4.

An advantage of the initialization method described in relation with FIG. 6 is that the potential of readout region FD at the end of the initialization phase depends, as in the example of FIG. 4, on threshold voltage $VT_{305}$ of transistor 305. Further, as compared with the initialization method of FIG. 4, an advantage of the initialization method of FIG. 6 is that it requires no current source, which enables to decrease the electric power consumption of the sensor during the initialization phase.

It should be noted that, as shown in FIG. 6, the potential $V_{RT}$ applied to node 304 may be held at a value $V_{DD1}$ smaller than voltage $V_{DD}$ during integration phase $T_1$, for example, a value 2 to 3 smaller than value $V_{DD}$, to decrease the electric power consumption of the sensor during the integration phase.

As a variation, in the control methods described hereabove in relation with FIGS. 4 to 6, rather than applying to the gate of transistor 301 an intermediate signal $V_{TGref}$ generating a potential barrier between photodiode PD and readout region FD, signal $V_{TGref}$ may be selected to be greater than the pinch-off voltage of photodiode PD (while remaining smaller than the maximum of the potential well defined in readout region FD).

Figure 7:
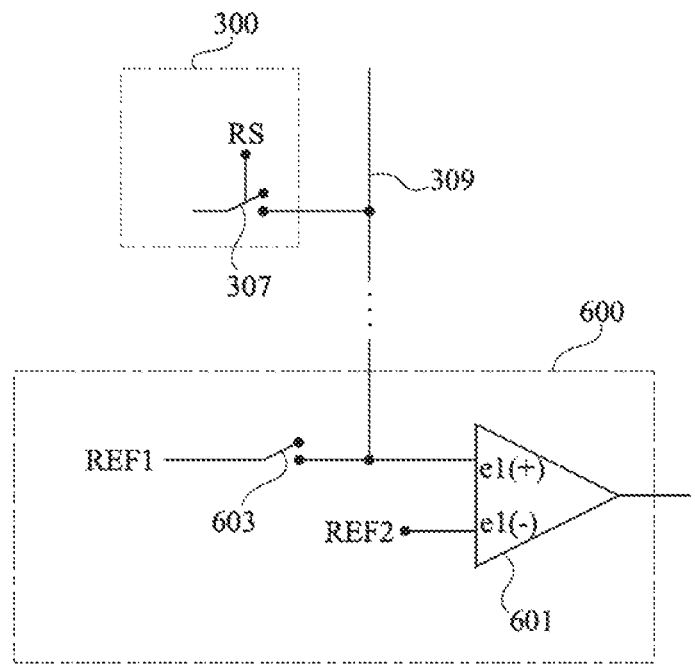
FIG. 7 schematically and partially shows an example of a peripheral readout circuit of an image sensor according to the first embodiment.

FIG. 7 schematically and partially illustrates an example of an image sensor according to an embodiment. FIG. 7 more particularly details an embodiment of a peripheral readout circuit 600 of a sensor of the type described in relation with FIGS. 3, 4, 5A, 5B, 5C, and 6.

In FIG. 7, only one pixel 300 of the sensor has been shown in the form of a block in broken lines. Only selection transistor 307 (controlled by a signal RS) and output conductive track 309 of pixel 300 have been detailed.

In the example of FIG. 7, peripheral readout circuit 600 comprises, for each pixel column, a voltage comparator 601 having a first input e1, for example, the positive input, coupled to the output conductive track 309 of the column and having a second input e2, for example, the negative input, connected to a node of application of a reference voltage REF2. The peripheral readout circuit further comprises a switch 603 coupling conductive track 309 of the column to a reference voltage REF1 smaller than REF2, for example, smaller by 50 mV than voltage REF2.

The operation of peripheral readout circuit 600 will now be described in relation with FIG. 8.

Figure 8:
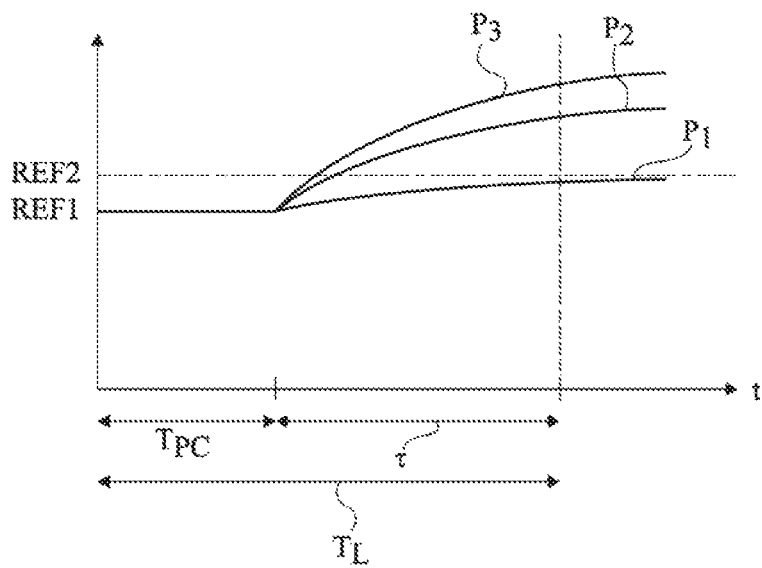
FIG. 8 is a timing diagram schematically illustrating the operation of the peripheral readout circuit of FIG. 7.

FIG. 8 is a timing diagram illustrating, for three different pixels $P_1$, $P_2$, $P_3$ of the sensor, the variation of potential $V_{CL}$ on output conductive track 309 of the column containing the pixel during a pixel readout phase $T_L$.

At the beginning of readout phase $T_L$, switch 603 is first turned on during a precharge phase $T_{PC}$, to precharge the output conductive track 309 of the column containing the pixel to potential REF1. Potential REF1 is for example selected to be greater than the saturation potential of pixel readout region FD.

At the end of precharge phase $T_{PC}$, switch 603 is turned off and selection transistor 307 of the pixel of the column which is desired to be read out is turned on. The potential of output conductive track 309 then increases at a speed which is all the greater as the potential of pixel readout region FD is high, that is, all the greater as the quantity of light energy received by the pixel from the beginning of the integration period is low.

After a predetermined settling time interval τ, the output of comparator 601 is sampled and defines an output bit of the pixel. If the pixel increases the voltage of conductive track 309 above value REF2 during time interval τ, it can be deduced that the quantity of photogenerated electrons integrated in readout region FD from the beginning of the integration period is relatively low, and more particularly such that $V_{FD}-V_{T305}$>REF2, where $V_{FD}$ designates the potential of readout region FD. The output bit of the pixel generated at the end of the readout phase then is in a high state. If, conversely, the turning on of pixel selection switch 307 does not cause the switching of the comparator during period τ, it can be deduced that the quantity of photogenerated electrons integrated in readout region FD from the beginning of the integration period is relatively high, and more particularly such that $V_{FD}-V_{T305}$<REF2. The output bit of the pixel generated at the end of the readout phase then is in a low state.

An advantage of such a method of reading and of one-bit quantizing the output value of a pixel, by simple balancing and then unbalancing of output conductive track 309 of the column containing the pixel, is that it is particularly fast and consumes very little power. In particular, it is not necessary to wait for a complete stabilization of the potential of the output conductive track of the column, that is, settling time τ may be selected to be smaller than the time constant of circuit RC defined by conductive track 309.

Such a readout operation may be carried out row by row, simultaneously for all the pixels in a same row and sequentially for pixels of different rows.

The row scanning frequency may be selected according to the desired resolution of the final output value of the pixels, to the number of sensor rows, and to the time assigned to each step of reading a binary output value of a pixel.

As an illustration, considering a sensor at the QVGA format (320 columns and 240 rows), a quantization over 32 levels (that is, 5 bits), and a readout time $T_L=T_{PC}+\tau=10$ μs (that is, a scanning of the rows at a 100-kHz frequency), the rate of image acquisition by the sensor may reach a value FPS in the order of 1/(32*240*10 μs), that is, approximately 15 images/s.

The quantization thresholds of the peripheral readout circuit may be adjusted column by column, for example, according to the general luminosity of the scene, or according to any other specific criterion. As an example, the darker the scene, the higher values REF1 and REF2 can be selected.

Further, the sensor row scanning frequency may be adapted according to the desired resolution, or according to any other specific criterion.

In an alternative embodiment, the frequency of the scanning of the sensor rows is dynamically modified during the integration phase $T_I$ of an image acquisition phase $T_F$, for example, to compensate for the response inversely proportional to the illumination induced by the provided operating mode when the sensor row scanning frequency remains constant all along integration period $T_I$. As an example, the row scanning speed may be selected to be inversely proportional to the rank of the sensor scanning during the integration phase. In other words, the second scanning of the sensor rows may be twice slower than the first scanning, the second scanning may be three times slower than the first scanning, and so on until the n-th scanning, which will be n times slower than the first scanning. This provides a linear response according to the illumination, and no longer a response inversely proportional to the illumination.

It should further be noted that the image acquisition rate (FPS) and the sensor row scanning frequency during integration period $T_I$ are parameters which may be set independently from each other. As an example, for a scene having a small dynamic range, a fast scanning of the sensor lines may be desired to clearly perceive the details of the scene. However, once the n successive scannings of the sensor have been performed, the sensor may be placed on standby until the next acquisition.

In addition to the low power consumption and low bulk advantages of the peripheral readout circuits, an advantage of the described embodiments is that they are compatible with already widely tried and tested existing architectures of pixels and of pixel arrays. Indeed, as compared with a conventional image sensor comprising peripheral circuits capable of reading and digitizing over a plurality of bits the output voltage of each pixel at the end of a pixel integration phase, the implementation of the described embodiments does not require modifying the architecture of the pixel array, but only modifying the peripheral readout and control circuits of this array. The provided readout method can thus be implemented jointly with a conventional addressing and reading method.

Further, the data coding type enables to easily carry out various logic or arithmetic operations.

For example, to identify the value of the brightest pixel, respectively of the least bright pixel of a same pixel column, it is sufficient to store the value of the first pixel, respectively of the last pixel, which crosses the quantization threshold set by the peripheral column readout circuit during an image acquisition phase.

Similarly, to obtain the median value of a column, it is sufficient to store the value of the $(L/2)^{th}$ pixel in the column which crosses the quantization threshold set by the peripheral column readout circuit, where L designates the number of sensor rows.

Further, a weighted sum of output values of pixels of a same column may be implemented relatively simply by associating with each pixel a weighting coefficient and by applying this coefficient to each binary output value (0 or 1) obtained at the quantizer output for the pixel. In particular, to obtain a weighted sum of the output values of the pixels of a same column, a weighting coefficient $k_j$ may be assigned to each row of rank j of the sensor, where j is an integer in the range from 1 to L. Each time a row is selected and the corresponding pixel in the column is read out and one-bit quantized by the peripheral readout circuit coupled to the column, the binary result of the quantization is multiplied by the coefficient $k_j$ assigned to the row, and stored in a digital integrator. The value of the digital integrator at the end of the $n^{th}$ scanning of the sensor corresponds to the weighted sum of the column pixels.

More generally, the nature of the coding of the illumination levels obtained by the provided readout method (time code formed by the position of a transition edge between a low state and a high state in the binary output sequence of the quantizer associated with the pixel) enables to relatively easily carry out various operations or processings on the fly, that is, along the acquisition of the output bits associated with each pixel. For example, the coding performed easily enables to generate on the fly a histogram of the acquired image.

Further, the obtained code is well adapted to the implementation of an operation of on-the-fly calculation of a transform or projection of the image acquired in another representation domain, for example, a transform from the spatial domain to the frequency domain such as a DCT-type transform ("Discrete Cosine Transform") of a DWT-type transform ("Discrete Wavelet Transform"), or also a transform by a transformation matrix capable of performing a reduction of dimensions aiming at enhancing certain characteristics of the scene, for example, to perform classification operations.

Figure 9:
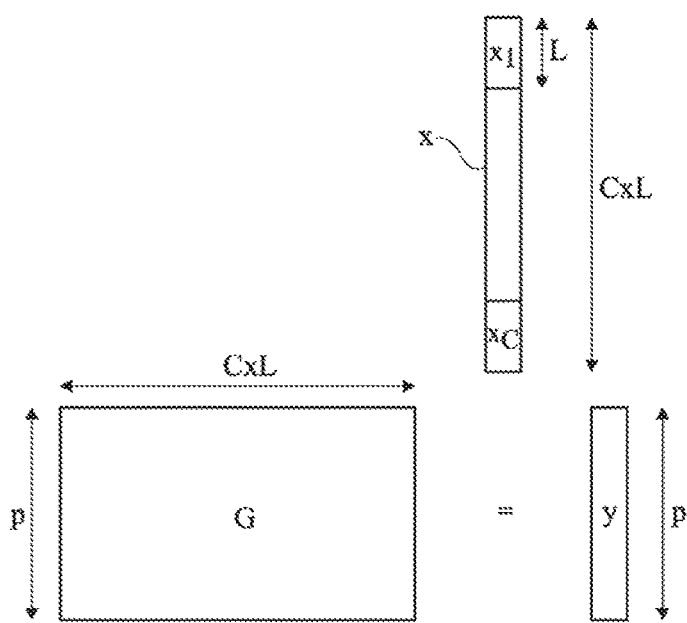
FIG. 9 illustrates an example of a method of processing output data of an image sensor.

Conventionally, an operation of transformation of an image of L rows and C columns (where L and C are integers) into another representation domain may be performed as illustrated in FIG. 9.

FIG. 9 more particularly shows a vector x of dimension C*L formed by the placing end-to-end of C vectors $x_1, \ldots, x_C$ of dimension L, each vector $x_i$, i being an integer in the range from 1 to C, corresponding to the sequence of the L values $x_i(1), \ldots x_i(L)$ of the pixels of the column of rank i.

The operation of transformation of the image into another representation domain corresponds to the multiplication of vector x by a transformation matrix G comprising C*L columns and p rows, where p is an integer. The vector y of dimension p resulting from this multiplication corresponds to the result of the transformation.

In a conventional image sensor, all the output values of the sensor pixels must have been read and stored before the transformation operation can be performed. This implies having a memory capable of simultaneously storing all the output values of the sensor pixels.

The nature of the coding of the illumination levels obtained by the readout method provided hereabove enables to perform the same transformation operation, on the fly, on the binary image planes supplied by the sensor after each scanning of all the sensor lines.

Figure 10:
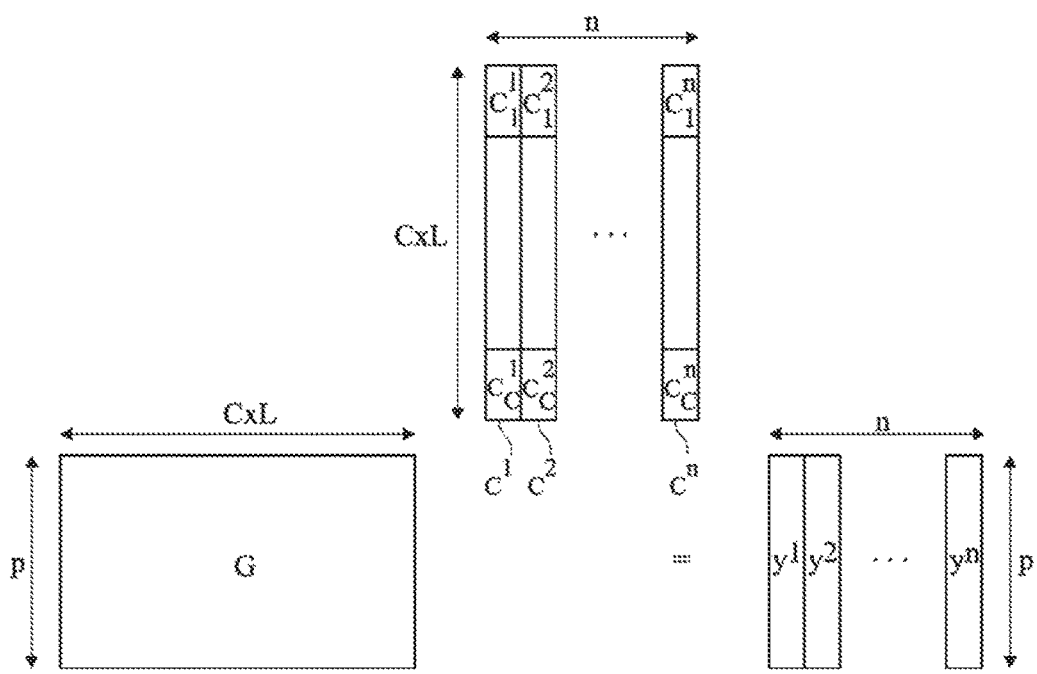
FIG. 10 illustrates an example of a method of processing output data of an image sensor according to the first embodiment.

FIG. 10 illustrates an example of implementation of such an operation of on-the-fly calculation of a transform of the image acquired by a sensor of L rows and C columns according to an embodiment.

For each full scanning of rank k of the sensor, k being an integer in the range from 1 to n and n designating the total number of successive scannings of the sensor during an image acquisition phase, a binary vector $c^k$ of dimension C*L is generated. Each vector $c^k$ is formed by placing end-to-end C vectors $c_1^k, \ldots c_C^k$ of dimension L, each vector $c_i^k$, i being an integer in the range from 1 to C, corresponding to the sequence of the L binary values $c_i^k(1), \ldots c_i^k(L)$ of the pixels of the column of rank i obtained during the $k^{th}$ scanning of the sensor.

The sensor for example comprises a memory of dimensions C*L bits capable of storing vector $c^k$.

At the end of each scanning of rank k of the sensor, the vector $c^k$ obtained at the end of the scanning is multiplied, by an adapted processing circuit, by transformation matrix G of the transform, which results in the generation of a vector $y^k$ of dimension p corresponding to the result of the multiplication.

Along the successive scannings of the sensor, vectors $y^1, \ldots y^n$ are integrated or accumulated by an integration circuit having p paths, to obtain, at the end of the last scanning of rank k=n, a vector $y=y^1+\ldots+y^n$ of dimension p corresponding to the final result of the transformation. More particularly, the integration circuit may comprise, for each of the p output values of vector y, an integrator capable of integrating on the fly value $y(r)=y^1(r)+\ldots+y^n(r)$, where r is an integer in the range from 1 to p.

Thus, the transformation operation may be broken down into n successive operations of transformation of the binary image planes obtained at the end of the successive scannings of the sensor. Such operations of transformation of the binary image planes may be performed on the fly without waiting for the acquisition of the full image by the sensor. This enables to calculate the transform without having to simultaneously keep in the memory the n acquired binary image planes. The dimensions of the memory circuits associated with the sensor can thus be decreased, particularly in the case where rather than the final image, only the result of the transformation is desired to be kept.

Specific embodiments have been described. Various alterations, modifications, and improvements will occur to those skilled in the art. In particular, the described embodiments are not limited to the specific example of a pixel described in relation with FIG. 3. More generally, the described embodiments are compatible with most known architectures of CMOS pixels, for example, 3T pixels, which differ from the pixel of FIG. 3 in that they do not comprise transfer gate 301 and readout region FD, the storage region of photodiode PD being then directly connected to the gate of readout transistor 305.

Further, the described embodiments are not limited to the pixel initialization method described in relation with FIG. 4, where the readout region of each pixel is initialized at a reference potential via pixel readout transistor 305. As a variation, the pixels may be initialized by any other known initialization method, for example, via their reset transistor 303 only.

Further, the described embodiments are not limited to the example of 1-bit quantization circuit described in relation with FIG. 7. More generally, any other circuit of 1-bit quantization of the output value of a pixel may be used, provided for the sampling and the 1-bit quantization to be non-destructive for the pixel output value.

Further, the described embodiments are not limited to the case where, during an image acquisition phase, each pixel is successively selected a predetermined number of times. As a variation, number n of pixel selections may be dynamically adapted according to the output state of the pixels. For example, the acquisition may be interrupted as soon as at least one of the pixels crosses the switching threshold of the comparator which is associated therewith, or when at least one of the pixels crosses the switching threshold of the comparator which is associated therewith after a predetermined number of sensor scannings.

In the previously-described embodiments, it is provided to observe, by successive scannings of the pixel array, the variation of the output signals of the pixels during the integration period. As explained hereabove, the quantization resolution of the signal then depends on the number of successive scannings of the sensor performed during the integration period. A limitation of such an operating mode is that, in practice, the integration period may be adjusted according to the average luminosity level of the scene, for which an image is desired to be acquired. More particularly, for a dark scene, the sensor integration period may be selected to be longer than for a bright scene. To keep a constant quantization resolution, the sensor scanning speed thus has to be adjusted according to the ambient luminosity level, which raises various problems.

According to an aspect of a second embodiment, a sensor similar to the previously-described sensors is provided, but where the sensor scanning speed and the quantization resolution of the signal may be determined independently from the duration of the integration period.

As in the previously-described examples, the sensor comprising a plurality of identical or similar pixels, each pixel comprising a photodetector and a control and readout circuit capable of integrating, on a capacitive pixel sense node, a photocurrent representative of the light flow received by the pixel photodetector, is provided.

The operation of the sensor according to the second embodiment is the following. During an image acquisition phase, each pixel is first reset, for example, identically or similarly to what has been previously described. An integration phase of predefined duration is then implemented, during which the voltage on the pixel sense node decreases according to the quantity of light energy received by the pixel from the beginning of the integration phase.

Unlike the previous examples, the voltage of the pixel sense node is not sampled during the integration phase.

At the end of the integration period, the sense node is isolated from the photodetector to store on the sense node a voltage representative of the illumination level received by the photodetector during the integration period. As an example, in the case of a pixel of the type described in relation with FIG. 3, at the end of the integration period, transfer gate 301 is blocked by application of a low-level signal onto node TG, to isolate readout region FD from photodiode PD.

At the end of the integration period, for example, consecutively to the integration period, a phase of reading the voltage level present on the sense node is implemented. During the readout phase, the voltage present on the sense node is successively synchronously sampled and one-bit quantized a plurality of times, for example, periodically, by a peripheral readout circuit external to the pixel. To achieve this, the sensor is successively scanned a plurality of times, similarly to what has been previously described. However, conversely to the previously described examples where the one-bit quantization threshold was constant all along the integration period, in the second embodiment, the one-bit quantization threshold varies monotonously, for example, according to an increasing linear ramp, all along the readout period. The resulting binary signal may be stored and/or integrated in a digital integrator external to the pixel, for example, a digital counter. As in the previous embodiments, the sense node of the pixel is not reset during the readout phase.

Figure 11:
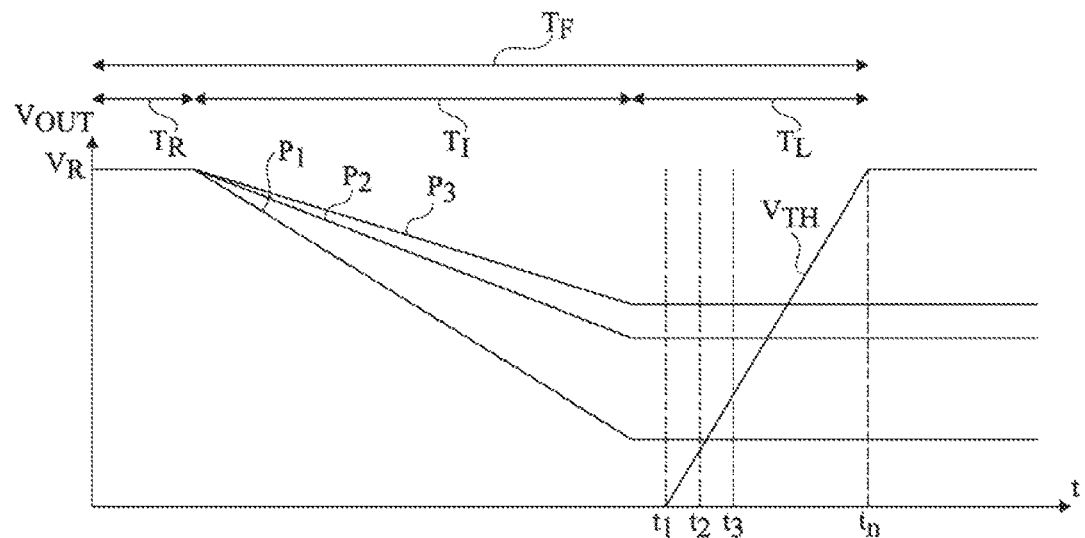
FIG. 11 is a timing diagram schematically illustrating the operation of an image sensor according to a second embodiment.

FIG. 11 is a timing diagram schematically illustrating the operation of an image sensor according to the second embodiment.

As in the example of FIG. 1, FIG. 11 shows the time variation, for three different pixels $P_1$, $P_2$, $P_3$ of the sensor, of output voltage $V_{OUT}$ of the pixel (that is, the voltage on the capacitive sense node of the pixel) during an image acquisition phase $T_F$.

During acquisition phase $T_F$, each pixel is first reset during an initialization phase $T_R$. During initialization phase $T_R$, the pixel output voltage is set to a value $V_R$. An integration phase of predefined duration is then implemented for pixel $T_I$. During integration phase $T_I$, the output voltage $V_{OUT}$ of each pixel decreases at a speed which is a function of the light intensity received by the pixel. At the end of integration phase $T_I$, the sense node of each pixel is isolated from the photodetector of the pixel, to store on the sense node of the pixel a voltage level representative of the illumination level received by the pixel during integration phase $T_I$. Once the sense node of each pixel of the sensor has been isolated from the pixel photodetector, its voltage level remains substantially constant. A readout phase $T_L$ is then implemented. During readout phase $T_L$, each pixel is read out a plurality of times at predetermined times $t_1, \ldots t_n$, where n is an integer designating the number of successive pixel readouts during readout phase $T_L$, for example greater than or equal to 4. In the shown example, the pixel is periodically read out at a frequency in the order of $n/T_L$ during all along readout phase $T_L$. Between two successive readouts of a sensor pixel row, all the other sensor rows are scanned once similarly to what has been previously described. Thus, during readout phase $T_L$, the sensor is scanned n times at a frequency in the order of $n/T_L$.

Each time the pixel is read out, output voltage $V_{OUT}$ of the pixel is 1-bit quantized. To achieve this, output voltage $V_{OUT}$ of the pixel is compared with a predefined threshold $V_{TH}$ by a comparator external to the pixel, and the result of the comparison is stored. At the end of readout phase $T_L$, the obtained sequence of n binary samples defines the pixel output value. Unlike in the previously described examples, and in particular in the embodiment of FIG. 1, in the example of FIG. 11, threshold $V_{TH}$ is not constant but varies monotonously, for example, according to an increasing linear ramp, all along readout phase $T_L$.

A sequence of n output bits similar to the sequences shown in FIGS. 2A, 2B, and 2C is thus obtained for each pixel. More particularly, for each pixel, the binary output signal of the pixel is in a first state (for example, in the low state) while voltage $V_{TH}$ is smaller than the voltage level present on the pixel readout node. When voltage $V_{TH}$ reaches a level equal to the output voltage of the pixel, the binary output signal of the pixel switches to a second state (for example, to the high state). The binary output signal of the pixel then remains in the second state until the end of readout phase $T_L$.

As in the previous examples, the position of the transition edge between the low state and the high state in the binary output sequence of the pixel is representative of the light intensity received by the pixel during integration phase $T_I$. The more strongly the pixel is illuminated, the sooner the transition edge occurs in the binary pixel output sequence, and conversely. As previously described, the n values of the binary output sequence of the pixel may be digitally integrated to supply an output value of the pixel coded over a number of bits smaller than n.

Thus, the operating mode described in relation with FIG. 11 has the same advantages as the previously-described embodiments, particularly in terms of coding format of the output data and of compatibility with an on-the-fly processing of the binary output data of the pixels, and has the additional advantage of enabling to select the sensor scanning speed and the quantization resolution of the signal independently from the duration of the integration period.

Figure 12:
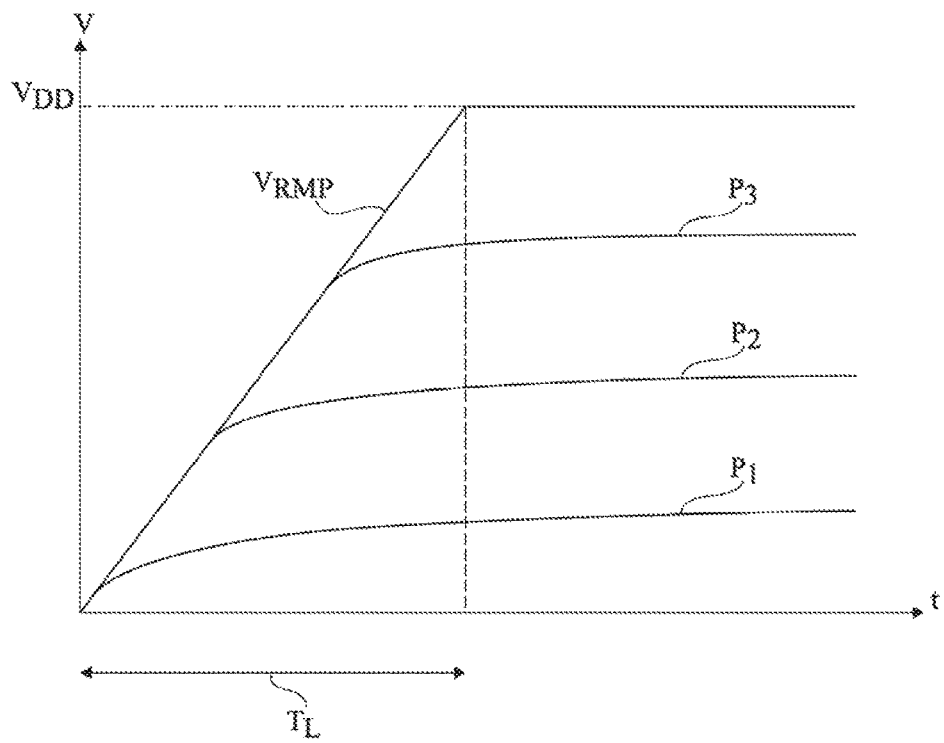
FIGS. 12 and 13 are timing diagrams illustrating in further detail an example of an operating mode of an image sensor according to the second embodiment.
Figure 13:
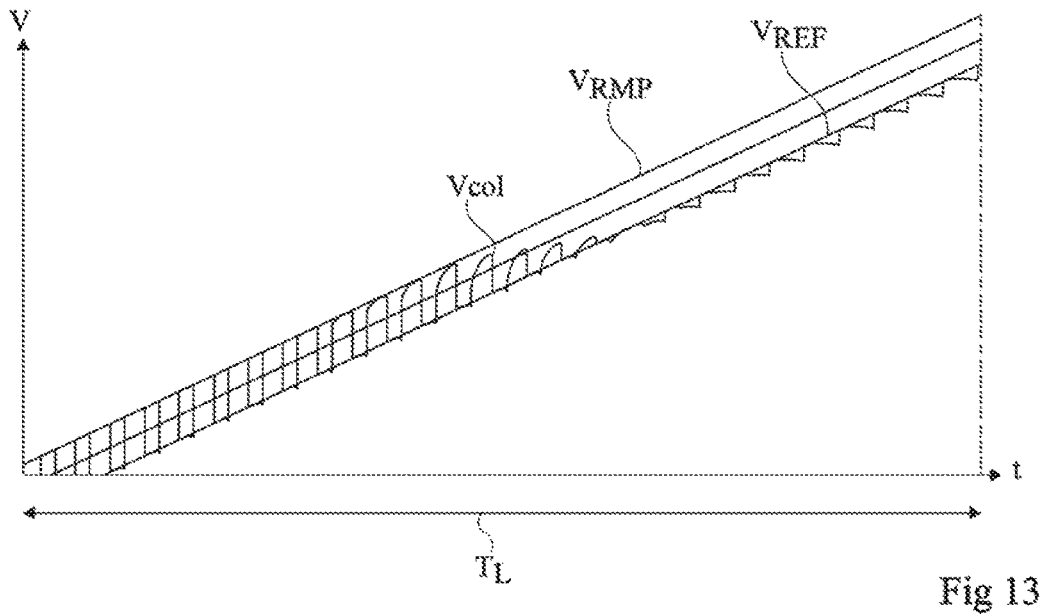

FIGS. 12 and 13 are timing diagrams illustrating in further detail an example of an image sensor readout method according to the second embodiment. A sensor of the type described in relation with FIG. 3 is considered in this example. FIGS. 12 and 13 more particularly illustrate the implementation of the pixel readout phase $T_L$, following integration phase $T_I$.

FIG. 12 more particularly shows the variation of a voltage $V_{RMP}$ applied to the drain node of voltage follower transistor 305 of each pixel of the sensor during readout phase $T_L$. FIG. 12 further shows the variation, for three different pixels $P_1$, $P_2$, $P_3$ of the sensor, of the voltage on the source node of voltage follower transistor 305 of the pixel during phase $T_L$.

Voltage $V_{RMP}$ follows an increasing ramp, for example, linear, all along readout phase $T_L$. As an example, voltage $V_{RMP}$ increases linearly from a zero value at the beginning of readout phase $T_L$ to reach a value substantially equal to nominal power supply voltage $V_{DD}$ of the sensor at the end of readout phase $T_L$. During phase $T_L$, the different rows of the pixel array of the sensor are successively scanned a plurality of times to observe the variation of the voltage on the source nodes of transistors 305 of the pixels.

In each pixel the voltage on the source node of transistor 305 first follows the increase of voltage $V_{RMP}$, to reach a voltage substantially equal to Vpix–Vth$_{305}$, where Vpix designates the voltage on the gate of transistor 305, and Vth$_{305}$ designates the threshold voltage of transistor 305. The voltage on the source node of transistor 305 then remains substantially constant and equal to value Vpix–Vth$_{305}$, while the voltage on the drain node of transistor 305 keeps increasing until the end of phase $T_L$.

In the readout method of FIGS. 12 and 13, it is provided, for each sensor scanning and for each pixel of the sensor, to one-bit quantize the interval between voltage $V_{RMP}$ and the source voltage of transistor 305 of the pixel to detect the crossing by voltage ramp $V_{RMP}$ of value Vpix–Vth$_{305}$.

To achieve this, at each sensor row readout step, the stray capacitances of output conductive tracks 309 of the pixels in the row are first precharged to a voltage $V_{REF}=V_{RMP}-\Delta V$, where $\Delta V$ is a value which is constant during the entire readout phase, for example, in the range from 0.1 to 1 V. Output conductive tracks 309 are then left floating, after which the selection transistors 307 of the pixels in the row are turned on. For each pixel in the row, voltage $V_{col}$ of output conductive track 309 of the pixel then settles at a value which is a function of voltage Vpix present on the gate of transistor 305. As long as value Vpix–Vth$_{305}$ is greater than voltage $V_{REF}=V_{RMP}-\Delta V$, a positive variation of the voltage level of output conductive track 309 of the pixel during the turning-on of selection transistor 307 can be observed. However, when value Vpix–Vth$_{305}$ becomes smaller than or equal to $V_{REF}=V_{RMP}-\Delta V$, no voltage variation on output conductive track 309 of the pixel is observed any more at the turning-on of transistor 307.

As an example, the sensor comprises, for each pixel column, a comparator coupled to output conductive track 309 shared by the pixels in the column. At each sensor row readout step, the comparator compares voltage $V_{col}$ of track 309 (after the setting to the on state of transistor 307 of the pixel) with a threshold voltage $V_{TH}$ intermediate between voltages $V_{RMP}$ and $V_{REF}$, for example substantially equal to VRMP–$\Delta V$/2. The result of the comparison is stored and, at the end of readout phase $T_L$, after n successive scannings of the pixel array, the series of n binary samples obtained for each pixel defines the pixel output value.

FIG. 13 illustrates the variation of voltages $V_{RMP}$, $V_{REF}$, $V_{TH}$, and $V_{col}$ (voltage $V_{col}$ is represented for a single pixel of the sensor) during readout phase $T_L$.

The position of the transition edge between the low state and the high state in the binary output sequence of the pixel is representative of the voltage level on the pixel sense node during readout phase $T_L$, and accordingly of the light intensity received by the pixel during integration phase $T_I$. More particularly, the position of the transition edge between the low state and the high state in the binary pixel output sequence is representative of the time of readout phase $T_L$ at which the voltage on the source node of transistor 305 of the pixel stops following the voltage ramp $V_{RMP}$ applied to the drain node of transistor 305. The more strongly the pixel has been illuminated during integration phase $T_I$, the lower the voltage on its sense node, and the sooner the transition edge occurs in the binary pixel output sequence, and conversely.

Figure 14:
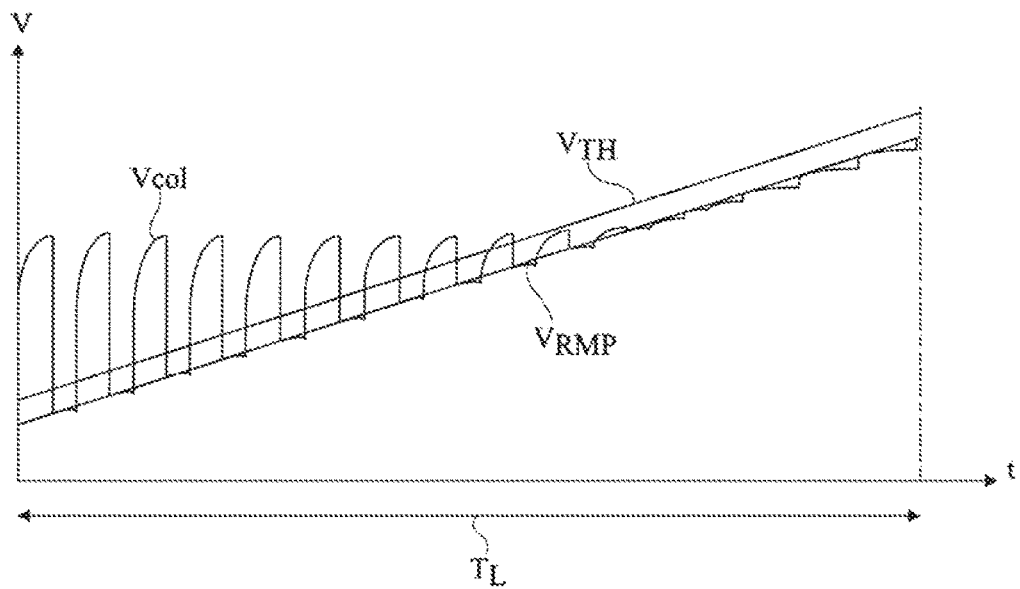
FIG. 14 is a timing diagram illustrating in further detail another example of an operating mode of an image sensor according to the second embodiment.

FIG. 14 is a timing diagram illustrating another example of an image sensor readout method according to the second embodiment. In this example, the voltage applied to the drain nodes of voltage follower transistors 305 of the sensor pixels is maintained substantially constant, for example, substantially equal to power supply voltage $V_{DD}$ of the sensor, all along readout phase $T_L$ of the sensor. A voltage ramp $V_{RMP}$ is however used as a voltage of precharge of output conductive tracks 309 of the sensor pixels. As an example, voltage $V_{RMP}$ increases linearly from a zero value at the beginning of readout phase $T_L$ to reach a value substantially equal to nominal power supply voltage $V_{DD}$ of the sensor at the end of readout phase $T_L$. During phase $T_L$, the different rows in the sensor pixel array are successively scanned a plurality of times.

At each sensor row readout step, the stray capacitances of output conductive tracks 309 of the row pixels are first precharged to voltage $V_{RMP}$. Output conductive tracks 309 are then left floating, after which the selection transistors 307 of the row pixels are turned on. For each pixel in the row, if voltage Vpix–Vth$_{305}$ present on the source node of transistor 305 is greater than voltage $V_{RMP}$, a positive variation of the voltage level of output conductive track 309 of the pixel can be observed when selection transistor 307 is set to the on state. In the opposite case, the voltage level of output conductive track 309 of the pixel does not vary when transistor 307 is set to the on state (indeed, transistor 305 is not biased by a current source thus can thus only increase or keep unchanged the potential of track 309).

As an example, the sensor comprises, for each pixel column, a comparator coupled to output conductive track 309 shared by the pixels in the column. At each sensor row readout step, the comparator compares voltage $V_{col}$ of track 309 (after the setting to the on state of transistor 307 of the pixel) with a threshold voltage $V_{TH}$ equal to $V_{RMP}+\Delta V$, where $\Delta V$ is a value which is constant all along the readout phase, for example, in the range from 0.1 to 1 V. The result of the comparison is stored and, at the end of readout phase $T_L$, after n successive scannings of the pixel array, the series of n binary samples obtained for each pixel defines the pixel output value.

FIG. 14 illustrates the variation of voltages $V_{RMP}$, $V_{TH}$, and $V_{col}$ (voltage $V_{col}$ is represented for a single pixel of the sensor) during readout phase $T_L$.

The position of the transition edge between the low state and the high state in the binary pixel output sequence is representative of the time of readout phase $T_L$ at which the voltage on the source node of transistor 305 of the pixel stops being greater than voltage ramp $V_{RMP}$. The stronger the pixel has been illuminated during integration phase $T_I$, the lower the voltage on its sense node, and the sooner the transition edge occurs in the binary output sequence of the pixel, and conversely.

It should be noted that in the example of a readout method of FIGS. 12 and 13, or in the example of a readout method of FIG. 14, it may be provided to limit the voltage excursion on output conductive tracks 309, and accordingly the dynamic power consumption of the sensor, by maintaining the voltage applied to the drain node of transistor 305 always smaller than the nominal power supply voltage $V_{DD}$ of the sensor, for example, smaller than or equal to a maximum value $V_{DD1}$ 2 to 3 times smaller than value $V_{DD}$. As a variation, a similar result may be obtained by limiting voltage RS for setting back to the on state selection transistor 307 to level $V_{DD1}$.

Further, it should be noted that an advantage of the embodiments described in relation with FIGS. 1 to 14 is that the output format of the data is particularly adapted to the implementation of functions of pixel sequencing by increasing or decreasing luminosity levels, and of histogram equalization. In particular, according to the envisaged application, it may be provided to associate with each pixel a value which is a function of the order in which the quantization threshold is crossed by the pixels.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An image sensor comprising:
    a plurality of pixels, each pixel comprising a photodiode and a sense node and being capable of supplying on the sense node an output signal representative of a quantity of light energy received by its photodiode during a pixel integration phase; and
    a control circuit configured to, during a phase of acquisition of an image, successively select each pixel a number n of times without resetting the pixel between the first and the last selection of the pixel and, for each selection of a pixel, compare the output signal of the pixel with a quantization threshold and read a binary signal representative of the result of the comparison, a sequence of n binary samples thus obtained forming a pixel output value.

2. The sensor of claim 1, wherein, for each pixel, the n successive selections of the pixel are performed during a same pixel integration phase.

3. The sensor of claim 2, wherein the quantization threshold is constant all along the integration phase.

4. The sensor of claim 2, wherein the control circuit is configured so that a time interval between two successive selections of the pixel is substantially constant all along the pixel integration phase.

5. The sensor of claim 2, wherein the control circuit is configured so that a time interval between two successive selections of the pixel varies during the pixel integration phase.

6. The sensor of claim 5, wherein the control circuit is configured so that the time interval between two successive selections of the pixel is inversely proportional to a rank of the selection from among the n successive selections of the pixel of the integration phase.

7. The sensor of claim 1, wherein, for each pixel, the n successive selections of the pixel are performed during a readout phase following the pixel integration phase.

8. The sensor of claim 7, wherein the quantization threshold varies monotonously all along the readout phase.

9. The sensor of claim 1, wherein each pixel comprises:
    a reset transistor coupling the sense node to a pixel reset node;
    a readout transistor assembled as a follower source, having a gate connected to the sense node and having a drain connected to the reset node; and
    a selection transistor coupling a source of the readout transistor to an output conductive track of the pixel.

10. The sensor of claim 9, wherein the control circuit is configured to, during the image acquisition phase, implement, for each pixel, a pixel initialization phase comprising resetting the sense node of the pixel to a first reference voltage via the output conductive track, the selection transistor, the readout transistor, and the reset transistor of the pixel.

11. The sensor of claim 10, wherein the control circuit is configured to, during the initialization phase of the pixel, configure the pixel as a common-source amplifier by applying a bias current to the pixel reset node and by applying a fixed reference potential to the output conductive track of the pixel.

12. The sensor of claim 10, wherein the control circuit is configured to, during the phase of initialization of the pixel, implement the successive steps of:
    setting to a reference potential the output conductive track of the pixel and then setting to a high impedance state said output conductive track;
    controlling the reset transistor and the selection transistor to the on state; and
    setting to a high impedance state the pixel reset node and forcing the output conductive track of the pixel to the reference potential.

13. The sensor of claim 9, wherein each pixel further comprises a transfer gate capable of controlling the transfer of photogenerated charges between the photodiode and the sense node.

14. The sensor of claim 9, wherein the control circuit comprises a peripheral readout circuit comprising at least one comparator, and wherein the output conductive track of each pixel is connected to a first input of said at least one comparator.

15. The sensor of claim 14, wherein the control circuit is configured to, for each selection of the pixel during the integration phase of the pixel, implement the steps of:
   a) precharging the output conductive track of the pixel to a second reference voltage;
   b) applying a third reference voltage greater than the second reference voltage to a second input of said at least one comparator;
   c) turning on the pixel selection transistor; and
   d) after a predetermined settling time after step c), reading an output value of the comparator.

16. The sensor of claim 1, wherein the pixels are arranged in an array of rows and columns, and wherein the control circuit is capable of simultaneously controlling the pixels of a same row and of successively controlling the pixels of different rows according to a control method of rolling shutter type.

17. The sensor of claim 1, wherein said quantization threshold is adjustable.

18. A device comprising the sensor of claim 1, and a circuit of on-the-fly processing of the binary signals read by the control circuit.

19. The device of claim 18, wherein the processing circuit is capable, for each scanning of all the plurality of pixels, of multiplying a binary input vector formed by all binary signals read by the control circuit of the sensor for the plurality of pixels, by a transformation matrix.

20. The device of claim 19, wherein the processing circuit is capable, during successive scannings of all the plurality of pixels, of integrating successive output vectors resulting from the multiplication of the successive input vectors by the transformation matrix.

* * * * *

UNITED STATES PATENT AND TRADEMARK OFFICE
CERTIFICATE OF CORRECTION

PATENT NO. : 10,484,635 B2
APPLICATION NO. : 15/675762
DATED : November 19, 2019
INVENTOR(S) : Arnaud Verdant and William Guicquero Page 1 of 1

It is certified that error appears in the above-identified patent and that said Letters Patent is hereby corrected as shown below:

On the Title Page

Item (30) Foreign Application Priority Data should read as follows:
November 3, 2016 (FR) 16 60627

Signed and Sealed this
Twenty-eighth Day of January, 2020

Andrei Iancu
*Director of the United States Patent and Trademark Office*